United States Patent

[11] 3,631,467

[72] Inventors Mario M. Vojvodich Montclair; Herbert B. Gillis, Matawan, both of N.J.

[21] Appl. No. 35,381
[22] Filed May 7, 1970
[45] Patented Dec. 28, 1971
[73] Assignee The Singer Company New York, N.Y.

[54] LADDERLESS, DUAL MODE ENCODER
3 Claims, 4 Drawing Figs.

[52] U.S. Cl. .......... 340/347 NT
[51] Int. Cl. .......... H03k 13/16
[50] Field of Search .......... 340/347 NT, 347 AD

[56] References Cited

OTHER REFERENCES

Triple Play Speeds A–D Conversion by Aasnaes and Harrison, Electronic, April 1968, pages 69–72

Triple Ramp Analog to Digital Converter with Reverse Direction Third Ramp by Walton– IMB Tech. Disc., Vol. 11, No. 4, Sept. 1968, pp. 384–385

Four Ramp Integrating A–D Converter by Harrison, IMB Tech. Disc., Vol. 11, No. 2, July 1968, pp. 191–192

*Primary Examiner*—Daryl W. Cook
*Assistant Examiner*—Jeremiah Glassman
*Attorneys*—S. A. Giarratana and Thomas W. Kennedy

ABSTRACT: A ladderless, dual mode, analog to digital (A to D) converter for converting analog signals into a digital representation. The unknown analog input signals are applied for a fixed time period to an integrating circuit through a first input resistor causing the integrator output to reach a first signal level. A reference signal is thereafter applied to the input of the integrating circuit through the first input resistor or through an input resistor having the same value as the first input resistor, thus causing the output signal from the integrating circuit to approach a reference level. During the time that the reference signal is applied to the integrator, pulses from a clock source are stored in a first register. When the output of the integrator reaches the reference potential, the pulses supplied to the register are inhibited. Thus, data stored in the first register represent a first binary approximation of the magnitude of the unknown analog input signal. During a second conversion of the unknown signal, both the unknown analog signals and the reference signals are respectively applied to the input of the integrating circuit through input resistors each of which has a value substantially less than the value of input resistors used during the first conversion cycle. Both the unknown signals and the reference signals are provided to the input of the integrating circuit for a time determined by the first binary approximation stored in the first register during the first conversion cycle. Thereafter, only the reference signal is removed from the input to the integrator circuit so that only the unknown signal is applied for the remainder of the fixed time period causing the output signal of the integrator to assume a second level. Thereafter, the unknown signals are removed from the input of the integrator and the known reference signal is again applied thereto to cause the output signal level of the integrator to approach a reference signal level. For the time of the second conversion cycle during which only the reference signal is applied to the integrator circuit, pulses are fed to a second register. The binary sum of the data stored in the first register and in the second register represents the total binary approximation to the unknown input signal.

INVENTORS
MARIO M. VOJVODICH &
HERBERT B. GILLIS

BY [signature]
ATTORNEYS

INVENTORS
MARIO M. VOJVODICH &
HERBERT B. GILLIS
BY
ATTORNEYS

INVENTORS
MARIO M. VOJVODICH &
HERBERT B. GILLIS

BY [signature]
ATTORNEYS

LADDERLESS, DUAL MODE ENCODER

BACKGROUND OF THE INVENTION

This invention relates to an analog to digital (A to D) converter. More particularly, this invention relates to means for encoding analog signals into digital form. Still more particularly, this invention relates to a ladderless, dual mode, charge-gated A to D converter.

The prior art has produced a number of circuits for converting analog signals into digital data. Such methods include the techniques of successive approximation and successive approximation with feed-forward characteristics, as well as the use of charge-gated circuits.

Such methods have suffered from a number of shortcomings. For example, the charge-gated converter is characterized by a relatively slow conversion time, for example, a speed which is generally in excess of 5 milliseconds for a 10-bit conversion. Second, the offset stability required in the integrator for high speed charge-gated converters is difficult to obtain in view of the present state of the art. Moreover, the accuracy limitation of readily available components significantly minimizes the abilities of the charge-gated converter to operate satisfactorily.

The circuits which use feed-forward, successive-approximation techniques also suffer from a number of disadvantages. For example, such circuits generally require precision-resistive A to D and D to A (digital to analog) ladder networks and associated switches. In addition, such circuits are often generally characterized by their need for large precision-resistive components which are not easily miniaturizable. Moreover, such circuits are often complex and quite difficult to implement.

Accordingly, it is an object of this invention to provide a circuit which overcomes the shortcomings of the prior art.

It is another object of the present invention to provide a circuit which utilizes charge-gated or feed-forward principles in the implementation in a novel ladderless converter circuit.

It is another object of this invention to provide a circuit which increases the conversion speed by an order of magnitude while minimizing the increase in hardware.

It is another object of this invention to provide an A to D converter which minimizes the number of precision components required.

It is another object of this invention to provide a dual mode A to D converter circuit which is capable of pulse-duration or pulse width modulation of an analog voltage applied to the input of an integrating circuit.

It is another object of this invention to use an integration process for the storage of binary data obtained during successive conversion cycles in separate registers where the data from the first conversion is a coarse approximation of the analog signal and the data from the second conversion is a fine approximation of the analog signal and to determine the binary sum of the successively obtained data to provide an accurate indication of the magnitude of the unknown voltage.

It is a further object of this invention to provide an A to D converter which avoids costly and bulky precision-resistive ladder networks and precision analog switches.

These and other objects of the invention will become apparent from a review of this specification in conjunction with the accompanying drawings.

SUMMARY OF THE INVENTION

The A to D converter according to the invention comprises a ladderless, charge-gated, dual mode encoder circuit. The circuit embodies the ladderless concept by utilizing the technique of pulse width modulation for the D to A conversion in a circuit having a dual mode conversion capability.

The circuit according to the invention comprises a source of unknown analog input signals and a source of reference signals. A sampling circuit is provided for sampling either the unknown signal or the reference signal, or a combination of both signals, to provide the input to an integrating circuit. The integrating circuit includes an operational amplifier in circuit with a feedback capacitor. A single source of clock signals is provided which, in circuit with a counter network and a sequencing network, provides control signals for the programmed actuation of the components of the circuit. A first register is provided for storing a number of clock pulses which correspond to the first approximation of the unknown input signal during the first conversion cycle and a second register is provided for storing pulses representative of the unknown input signal during a second conversion cycle. The second conversion cycle occurs at an increased circuit sensitivity to the analog signals so that the first approximation and second approximation may be sequentially added in binary form.

In a preferred embodiment, the unknown input signal is applied to the input of the integrator through a fixed input resistor R for a fixed time period T, so that the output signal from the integrator reaches a first magnitude. The unknown signal is removed from the input of the integrator, and the reference signal is applied to the input of the integrator, preferably by way of the same input resistor. Since the reference signal has a polarity opposite to the polarity of the unknown signal, the output signal from the integrator changes direction and, for the preferred embodiment, begins to approach the value of a reference signal, such as zero volts. During the time that the reference signal is applied to the integrator $t=t_1$, the pulses from the cock source have been appropriately gated for storage in a first register. When the output of the integrator reaches the reference signal level, a reference signal detector is activated to disable the flow of pulses from the clock source to the first register. Thereafter, both the unknown signal and the reference signal are caused to be applied simultaneously to the input of the integrator through input resistors which have a value substantially less than the value of the input resistor used during the first conversion cycle. The unknown and reference signals are applied to the input of the integrator for a time period $t_{1a}$ determined by the number of pulses stored in the first register during time $t_1$.

Thereafter, the reference signal is removed from the input of the integrator and the output signal from the integrator is caused to approach a signal level determined by the application of the unknown analog signal to the input of the integrator for the remainder of the fixed time period T, i.e., the time $T-t_1$. Thereafter, the unknown analog signal is removed from the input of the integrator and the reference voltage applied thereto so that the output of the integrator again approaches the reference signal level. Simultaneously, clock pulses are stored in a second register for the time $t_2$ during which the unknown signals are applied to the input of the integrator. Thus, the sequential binary addition of the signals stored in the first register and the second register constitutes an accurate binary representation of the unknown analog signal.

The circuit according to the invention provides a significant number of advantages. For example, the circuit permits analog encoding with accuracies and speeds which are comparable to present day circuits, while yet utilizing a minimum amount of hardware. The circuit according to the invention permits the maximum use of noncritical components which can be easily microminiaturized. For example, the operational amplifier, the comparator, the input resistors, the hybrid field effect transistor (FET) switches, and the amplifier circuit may be miniaturized. THe circuit also exhibits a relatively fast conversion speed, for example, about 200 microseconds for a 12-bit conversion. Thus, its speed is fast, its components microminiaturizable, its hardware simple, and its cost relatively low. The circuit specifically avoids the use of large and costly components, such as precision resistive ladder networks and analog switches associated with each ladder branch.

DESCRIPTION OF THE PREFERRED EMBODIMENTS

Figure 1:
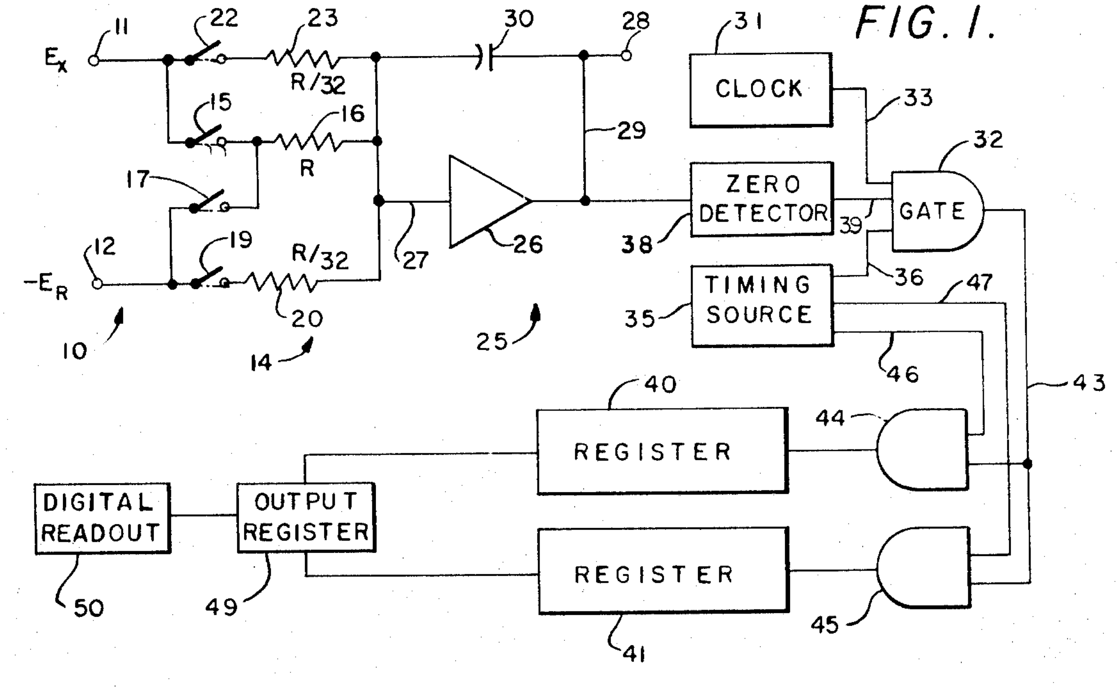
FIG. 1 is a block diagram illustrating the invention.

In FIG. 1, an input circuit, designated generally by reference numeral 10, includes a source of unknown analog signals, designated generally as "$E_x$," applied to an input terminal 11 and a source of reference potential, designated generally as "$E_r$," applied to an input terminal 12. It is necessary that the magnitude of $E_r$ be greater than or equal to the contemplated range for the unknown input signals and have an opposite polarity with respect to the unknown signals for convenient operation of the circuit.

A programmed sampling circuit is designated generally at 14 and includes a plurality of programmed switches and precision resistors for sequentially sampling the unknown input signal and the reference signal and combinations thereof, as will hereinafter be discussed in greater detail. Thus, the source of unknown signals applied to terminal 11 is in circuit with a controlled switch 15 connected in series with a precision resistor 16 having a value R. The reference signal $E_r$ applied to input terminal 12 is connected to a controlled switch 17 connected in series with the precision resistor 16.

The reference signal applied to the input terminal 12 is also in circuit with switch 19 in series with a resistor 20 having a value which is related in a binary sense to the value of resistor 16. Thus, for illustration, the resistor 20 is described as having a value of R/32, although it may have a value of R/64, R/128, or the like. Similarly, the source of unknown analog signals at the input terminal 11 is in circuit with a switch 22 which is in series with resistor 23 which has the same value as resistor 20, namely R/32.

An integrating circuit is designated generally at 25 and comprises an operational amplifier 26 having its input connected by lead 27 to the output of the sampling circuit 14 and its output connected to an output terminal 28 by way of lead 29. A feedback, or integrating capacitor 30 is connected between the output and the input of the operational amplifier 26.

A source of clock pulses 31 provides one of the inputs to a gate circuit 32 by way of lead 33. A timing circuit 35 comprises a plurality of outputs, three of which are representatively shown in FIG. 1, for providing control signals at predetermined times in the cycle for controlling the operation of various circuit elements. Thus, the timing source 35 provides a second input to the gate circuit 32 by way of lead 36. A reference level, or zero detector 38, is connected to the output of the integrating circuit 25 and to the third input of the gate circuit 32 by way of lead 39.

In operation, the unknown analog signals may be applied to input terminal 11 and to the input of the integrating circuit 25 through either resistor 16 or resistor 23 by the closure of switch 15, or switch 22, respectively, in accordance with a programmed sequence. This permits the feedback capacitor 30 across the operational amplifier 26 to achieve a negative signal level for positive unknown signals because of the phase inversion achieved in the operational amplifier, or to change in a negative direction upon the application of a positive unknown signal.

The unknown signals may be removed from the input of the integrating circuit 25 and the reference signal applied thereto by way of resistor 16 or resistor 20 by the closure of switch 17 or switch 19 respectively. The application of a negative reference signal to the input of the operational amplifier causes the output signal of the integrator due to the charge on the feedback capacitor 30 to move in a direction away from the output caused by the application of the unknown signal, i.e., toward a reference signal level such as zero. When the charge reaches the zero level, the zero detector issues an output signal. At the same time, the timing source provides a pulse on lead 36 which permits clock pulses from the clock source 31 on lead 33 to pass through gate 32 to be counted in either a counting register 40 or a counting register 41, depending upon the issuance of appropriate timing signals.

The output from gate 32 is provided on lead 43 to provide one of the inputs to both gate 44 and gate 45. An output from the timing source 35 on lead 46 provides the second input to gate 44, while another output from the timing source 35 on lead 47 provides the second input to gate 45. Thus, the clock signals on lead 43 may be gated by the timing signals through either gate 44 or gate 45 to either register 40 or register 41 respectively by the application of timing signals on either lead 46 or 47.

The pulses applied to register 40 and to register 41 actuate counting circuits therein to store a binary representation of the number of pulses applied to either register. The binary data stored in registers 40 and 41 are sequentially added in binary form according to Boolean principles in an output circuit 49 to provide a digitally encoded output which is representative of the magnitude of the unknown analog input signal.

Figure 2:
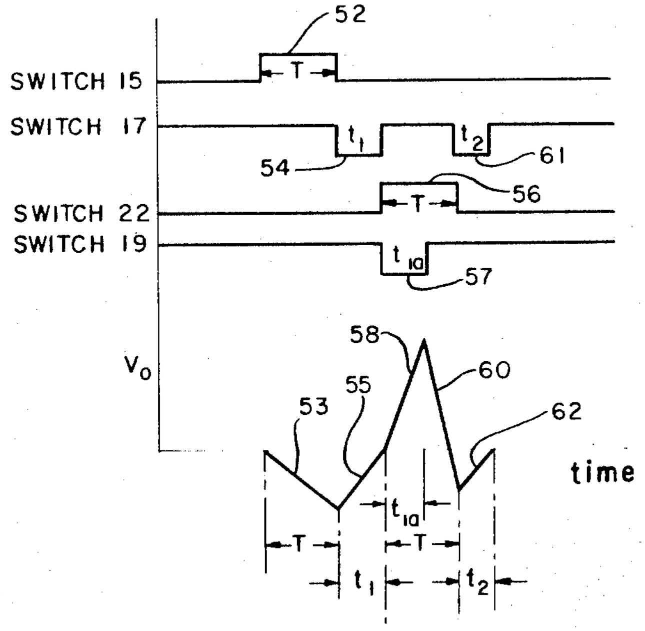
FIG. 2 is a diagram of the waveforms applied to the input switches in FIG. 1 to control their operation and of the output signal level of the integrator over a dual conversion cycle.

In FIG. 2, the driving pulses applied to the switches 15, 17, 19, and 22 of FIG. 1 to effect their closure are shown. For simplicity, a fixed time period is designated by T, while a variable time period which is the result of the variables in the circuit is designated by $t_1$, $t_{1a}$, and $t_2$.

FIG. 2 also shows the output voltage $V_0$ of the integrating circuit 25 at terminal 28 plotted against time to illustrate the output of the integrator when the various switches of the sampling circuit 14 in FIG. 1 are closed.

When a pulse 52 is applied to switch 15, the unknown analog input signal is applied by way of resistor 16 to the input of the operational amplifier 26 by the lead 27 so that the feedback capacitor 30 begins to charge negatively as indicated by the portion of the curve designated at 53 in FIG. 2. At the end of the fixed time period T, pulse 52 ceases, and switch 15 is opened, while pulse 54 is applied to switch 17 to cause the reference signal at the input terminal 12 in FIG. 1 to be applied through resistor 16 to the input of the operational amplifier 26 in a manner similar to the application of the unknown analog signal thereto. Thus, the potential at the output of the integrating circuit 25 begins to rise toward a zero potential, as indicated by the portion of the curve designated at 55 in FIG. 2.

The output voltage of the integrating circuit shown as the portion of the curve designated at 55 in FIG. 2 continues to rise until the output voltage reaches zero volts, at which time the zero detector 38 issues a signal which ends pulse 54 and time period $t_1$.

The output voltage of the integrating circuit 25 at the end of pulse 52 will be proportional to and represent the input signal $E_x$ since this output voltage is produced by integrating the input voltage $E_x$ over a fixed time interval T. The time period $t_1$ will be proportional to output voltage of the integrating circuit 25 at the end of pulse 52 because it is the time required for the output voltage of the integrator to go from the value at the end of pulse 52 to zero while integrating the fixed reference voltage $E_r$. Accordingly, the time $t_1$ is proportional to and represents the unknown input signal $E_x$.

While switch 17 is closed during pulse 54, clock signals from the clock source 31 are gated by an appropriate timing signal on lead 36 and lead 46 through gate 32 and gate 44 to the input of register 40 until the output voltage of the integrating circuit 25 rises to zero. The register 40 is connected as a binary counter to count the applied clock signals. When the output voltage of the integrator rises to zero, the zero detector will inhibit the gate 32 so that no more clock signals are applied to the input of register 40 to be counted thereby. Accordingly, the clock signals are counted in register 40 only during time period $t_1$. Since the time period $t_1$ is proportional to the input signal $E_x$, the number of pulses counted by register 40 will be a binary representation of the unknown analog input voltage $E_x$ to a resolution determined in part by the value R of the input resistor 16 and the clock frequency 31.

Since the count in register 40 must be an integral number, i.e., 4, 5...*n*, while the unknown input signal probably has a value other than an integral, i.e., 5.6 volts, the count stored in register 40 during the first conversion are only an approximation of the magnitude of the unknown analog input signal. For example, in a system sized so that one pulse indicates one volt, an input signal of 4.4 volts will cause the storage of only a count of four in the register and the system will thus have an error of 10 percent as determined by the remaining voltage, 0.4 volts, relative to the stored count. Thus, to enhance the resolution of the system, a second conversion is desirable.

The second conversion is achieved as follows. A pulse 56 is applied to switch 22 for a fixed time T having the same duration as pulse 52 applied to switch 15 in the first conversion. Concurrently, a pulse 57 is applied to switch 19 so that the reference voltage is applied to the integrator input through resistor 20 having a magnitude of R/32. Thus, the input to the integrating circuit 25 is the sum of the inputs of the unknown analog signal $E_x$ applied through resistor 23, which has a value R/32, and the reference voltage $E_r$ applied through resistor 20, which also has a magnitude of R/32. Since the magnitude of the reference voltage is greater than the anticipated magnitude of the unknown voltage and of opposite polarity, the output of the integrating circuit follows the waveform designated in FIG. 2 by the reference numeral 58.

The duration of pulse 57, designated as $t_{1a}$, is determined by the time $t_1$ as measured by the count stored in register 40. The time $t_{1a}$ will be equal to the clock pulse interval multiplied by the number stored in the register 40. The time $t_{1a}$ will usually be less than the time $t_1$ because the count registered in register 40 must be an integral member whereas the time $t_1$, which is directly proportional to $E_x$, will probably be a fraction of a clock pulse interval greater than this integral number of clock pulse intervals.

The integration of the sum of unknown and the reference signals is performed by the integrating circuit 25 under a condition in which the input resistance has been reduced to R/32 from R, so that the time constant of the integration is likewise reduced by a factor of 32. Accordingly, the sensitivity of the circuit is enhanced.

After a time $t_{1a}$, the pulse 57 shown in FIG. 2 terminates, and switch 19 is opened so that the reference signal is eliminated from the input of the integrating circuit 25. Thus, since switch 22 remains closed, as indicated by the pulse 56 in FIG. 2, the output from the integrating circuit 25 assumes the waveform indicated by the portion of the curve designated 60. Switch 22 remains closed for a total time period T indicated by pulse 56, or an additional time beyond the opening of the switch 19 equal to $T-t_{1a}$. If the count stored in register 40 were an exact representation of the input signal voltage $E_x$, then $t_{1a}$ would equal $t_1$ and the voltage at output 28 at the end of the pulse 56 would be zero because the output voltage will be proportional to $E_r t_{1a}-E_x T$ and $E_r t_1$ equals $E_x T$. In the usual case in which the count stored in register 40 does not precisely represent the input voltage $E_x$, there will be a signal voltage at output 28 at the end of pulse 56 and this voltage will represent the difference between the precise value of $E_x$ and the value represented by the count stored in register 40. This error signal will be on a scale expanded to 32 times greater than the scale of the representation of the input $E_x$ by the voltage at output 28 at the end of pulse 54 because the integration during pulses 56 and 57 is through resistors 20 and 23 having values of R/32. When switch 22 is opened at the end of pulse 56, thus removing the unknown signal from the input of the integrating circuit 25, switch 17 is again closed, as indicated by the pulse 61 in FIG. 2. When switch 17 is closed, the reference voltage is again applied to the input of the integrating circuit through resistor 16 and switch 17. The output voltage from the integrating circuit 25 thus assumes the waveform indicated by the portion of the curve designated at 62 in FIG. 2. Switch 17 remains closed under the influence of pulse 61 until a zero crossing is again detected by the zero detector 39, at which time pulse 61 is terminated. The time interval during pulse 61 is designated $t_2$.

During pulse 61, gates 32 and 45 are enabled by signals from timing source 35 on leads 36 and 47 so that during pulse 61 the clock signals will be counted in register 41. At the end of pulse 61 the zero detector 38 will inhibit gate 32 and register 41 will store a count representing the length of time interval $t_2$ in clock signal intervals. The time interval $t_2$ is a measure of the voltage at output 28 at the end of pulse 56, so the count registered in register 41 will represent the difference in value of $E_x$ and the value represented by the count in register 40. The representation by the count in register 41 is on a scale expanded to 32 times the scale on which the count in register 40 represents the input signal voltage. Thus, register 40 may be considered to store the digital number with a relatively "-coarse" resolution, while the pulses accumulated in register 41 may be considered to be the result of a conversion with a relatively "fine" resolution. The addition of the digital number in register 40 multiplied by 32 with the digital number in register 41 results in a digital output in circuit 49 that is equivalent to the unknown analog input voltage $E_x$. With binary numbers this operation is carried out in a simple manner as the binary number in register 41 becomes the less significant digits and the binary number in register 40 becomes the more significant digits. For example, for seven-bit registers with a two-bit overlap between the registers to provide a 12-bit output register 40 may store 0010100 and register 41 may store 0011011 so that the final output is 001010011011. As will be apparent from the above example the "two-bit overlap" means that the two most significant bits in register 41 and the two least significant digits in the register 40 have the same rank. These digits may be added in a conventional manner.

The circuit thus described may be conveniently considered to be a circuit to convert a voltage to time by the pulse duration or pulse width modulation of the reference voltage at the input to the integrator during the charging portion of the cycle.

Figure 3:
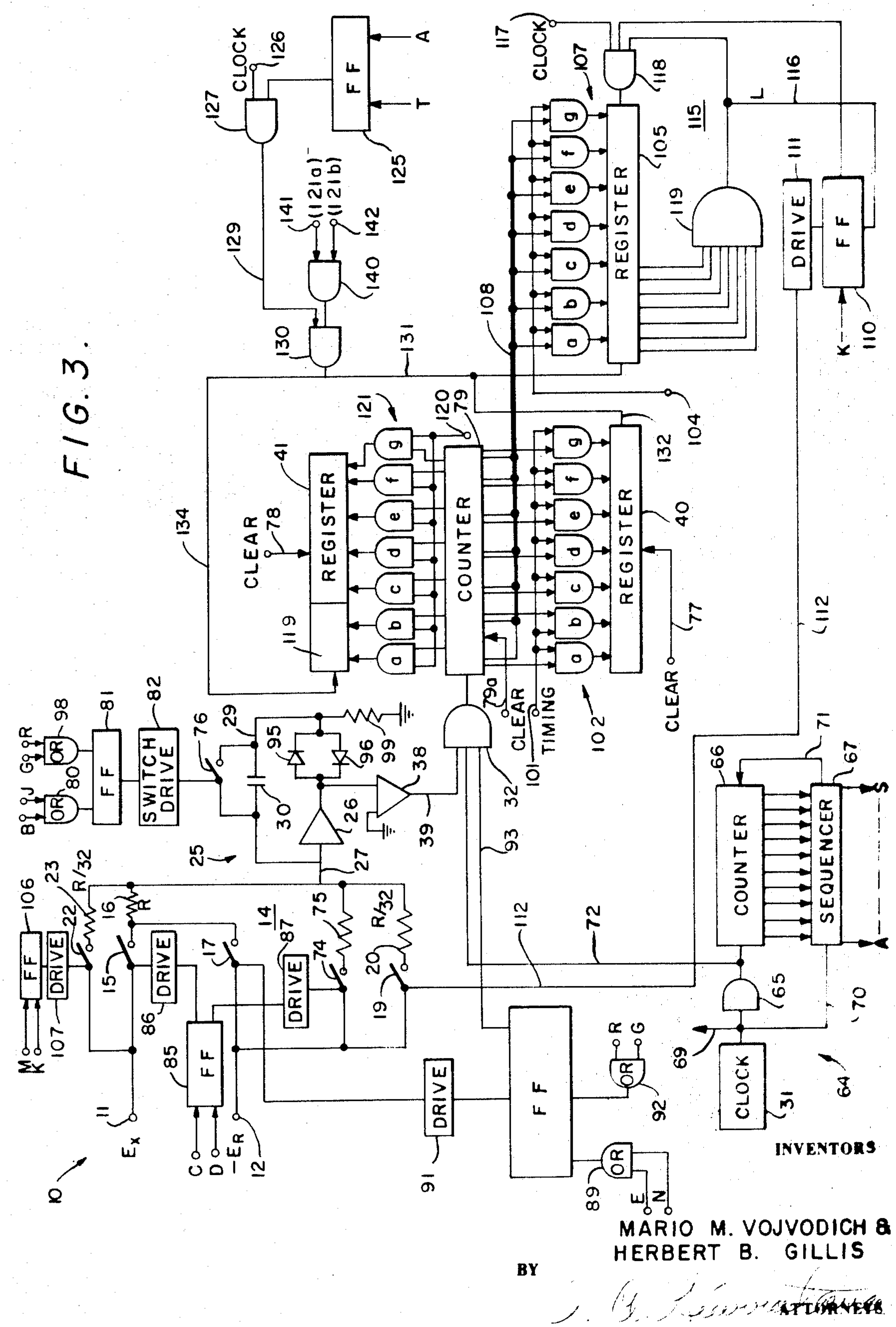
FIG. 3 is a detailed schematic, partially in block form, showing a preferred embodiment of the invention.

FIG. 3 is a block diagram showing in detail one embodiment of the 12-bit, charge-gated, feed-forward, A to D converter. In FIG. 3, those elements which correspond to the elements discussed in connection with FIG. 1 are denoted with like reference numerals.

With the arrangement designated generally by the reference numeral 64, all of the timing for the operation of the circuit and the control signals therefore have been derived from a clock circuit 31, for example, a 1 megaHertz clock. An inverter 65 is connected to the output of the clock and to the input of a counter circuit 66. The binary outputs from the counter 66 provide the input to a sequencer 67 which generates the basic timing sequence, designated by timing signals "A" through "S," shown in FIG. 4, to control the sequential operation of the converter. In a specific embodiment, the timing sequence is set at 576 microseconds, so that the timing and functional operation of the circuit is described in connection with that particular sequence. The selection of a timing sequence is dependent upon a number of factors so that the timing sequence discussed herein is intended to be a representative sequence for an operative embodiment.

Pulses from the output of the clock source 31 are provided on lead 69 for purposes which will be discussed, and on lead 70 to the sequencer 67. A feedback reset pulse from the sequencer 67 to the counter 66 is provided on lead 71 so that at the end of the timing cycle, the counter is reset to zero rather than having to finish its count. Thus, the beginning of a second cycle is contiguous to the end of a first cycle. An inverted clock pulse from inverter 65 is provided on lead 72 to provide one of the inputs to the gate circuit 32.

Returning to the input circuit of FIG. 3, the switches 15, 17, 19 and 22 previously described in connection with FIG. 1, switch 74 in series with resistor 75, and switch 76 in parallel with the feedback capacitor 30 in the integrating circuit 25 are shown having a switch drive circuit connected thereto.

In general, each of the switches is controlled by the application of control signals to a flip-flop. The output from the flip-flop controls the drive circuit for opening or closing the associated switch in accordance with the pulse signal from the sequencer 67 as will be hereinafter discussed in greater detail. An appropriate drive circuit includes a transistorized amplifier stage for controlling the base of a transistor switch, or the gate of a field effect transistor switch, the latter being the preferred switch because of its impedance characteristics and its fast switching time.

The circuit of FIG. 3 operates as follows:

At $t$=0, a pulse A causes the binary data stored in registers 40 and 41 at the end of the previous conversion to be parallel transferred to a single 12-bit register designated generally in FIG. 1 as a part of the output circuit 49 and which is not shown in FIG. 3.

A pulse B, delivered by sequencer 67 at 2 microseconds, is applied to register 40 on lead 77, to register 41 on lead 78, and to counter 79 on lead 79*a*. Pulse B operates to clear register 40, register 41, and counter 79, i.e., set each of the stages therein to its logical "0" state. Simultaneously, the pulse B is delivered to OR-gate 80 having its output connected to a flip-flop 81 which controls drive circuit 82 to open and close the switch 76 in parallel with the capacitor 30. At the end of the preceding cycle the flip-flop 81 will have been set and via the switch drive 82 will have closed the switch 76. Pulse B operates to reset the flip-flop 81 causing the switch drive 82 to open switch 76 to remove the short across the integrating capacitor 30.

A timing pulse C, at $t$=5 microseconds, is delivered to and sets flip-flop 85 which by means of a drive circuit 86 and a drive circuit 87 closes the switch 15 and the switch 74 respectively. When the switches 15 and 74 are closed, the unknown analog input signal is supplied by way of input terminal 11 through the input resistor 16 having a value R to the input of the integrating circuit 25. It has been found advantageous for the operation of the circuit to introduce a 1½-bit offset to the input of the integrator during the conversion cycle. Thus, when switch 74 is closed, the reference signal is supplied by way of input terminal 12 through resistor 75 having a value selected to provide a 1½-bit offset. The switches 15 and 74 remain in this condition and the operation of the circuit proceeds as described in connection with FIGS. 1 and 2 with the pulse 52 forming the portion of the curve designated at 53, except that the input is the combination of the unknown signal plus a portion of the known reference signal through resistor 75.

The value of the input resistor 75 was chosen to introduce a 1½-bit offset into a circuit to permit the use of up counters in the circuit. The 1½-bit bias, for the embodiment shown, is the maximum error which is introduced during the first conversion cycle. Since a one-bit error in the seven-bit conversion represents an error of one part in 128 ($2^7$=128), then a 1½-bit error represents an error of three parts in 256. By scaling the resistor at a magnitude of 85⅓ times the value of resistor 16, a 1½-bit bit bias is introduced.

A timing pulse D is provided at $t$=132 microseconds to reset the flip-flop 85, thus to open switches 14 and 74 through drive circuits 86 and 87 respectively. At the time that switches 15 and 74 are opened, the output voltage of the integrating circuit 25 corresponds to the unknown input voltage $E_x$ minus 1.5 bits of error introduced into the circuit through resistor 75.

At $t$=136 microseconds, a timing pulse E is provided from the sequencer 67 through OR-gate 89 to set flip-flop 90. The resulting output from flip-flop 90 provides a signal to a drive circuit 91, which closes the switch 17. The slight time difference, i.e., 4 microseconds, between pulse D and pulse E, permits time for the operational amplifier 26 to settle before the application of the reference signal $E_r$ through switch 17.

When the switch 17 is closed, the reference signal $E_r$ is applied from the input terminal 12 through the resistor 16 to the input of the integrating circuit 25. At the same time, an enabling signal from flip-flop 90 is provided on a lead 93 to the gate 32. When gate 32 receives this enabling signal and also is not inhibited by the zero detector 38 on lead 39, it will permit the clock pulses on lead 72 to pass through the gate 32 into the counter 79. The zero detector 38 will not inhibit the gate 32 until it detects that the output signal voltage of the integrating circuit 25 has crossed zero and becomes positive, at which time the zero detector 38 will inhibit the gate 32. Thus, during the time that switch 17 is closed, pulses from the clock 31 will pass into the counter 79. At the same time, the output of the integrating circuit 25 is approaching zero volts, from the minus side, as indicated by the portion of the curve 55 in FIG. 2.

As discussed in connection with FIG. 1, the integrating circuit 25 will integrate toward a reference level, i.e., zero volts, that is, until the zero detector 38 is actuated. In FIG. 3, the zero detector is a gate having one of its input leads connected to a source of reference potential such as ground.

In order to facilitate the zero detection, it is advantageous to utilize a pair of diodes 95 and 96 in a back-to-back connection at the output of the operational amplifier 26. The diodes 95 and 96 have a 0.5-volt forward breakdown characteristic. As the output signal from the integrating capacitor 29 approaches zero volts from the negative direction, the diode 96 is conducting and the diode 95 is cut off. When the output from the operational amplifier 26 reaches the breakdown voltage of the diode 96, it ceases to conduct, while at this instant of time, forward-biased so that it may not yet begin conduction. Thus, an effective open circuit appears in the feedback loop of the integrating circuit 25. When an open circuit thus appears, the gain of the amplifier is very high, causing a rapid change in the output of the operational amplifier 26 to a +0.5-volt level, at which time diode 95 becomes conductive and the circuit is again stabilized. This technique reduces the accuracy requirement of the zero detector 38 since, at the time that the output voltage of the integrating circuit 25 goes through zero volts, the voltage provided to the zero detector 38 crosses zero by at least 0.5 volts.

When the voltage applied to the zero detector 38 becomes more positive than the reference level applied thereto, the zero detector 38 is enabled and provides a signal to the gate 32 to inhibit the pulses from the clock 31 on lead 72 from continuing to pass into the counter 79. At this time, the number of pulses stored in the counter 79 is the binary equivalent of the unknown analog signal less one and one-half bits of introduced error plus or minus the error in the conversion process. Since the counter 79 and the associated registers 40 and 41 are shown as comprising seven stages, the total resolution of the first encoding pass is seven bits.

Figure 4:
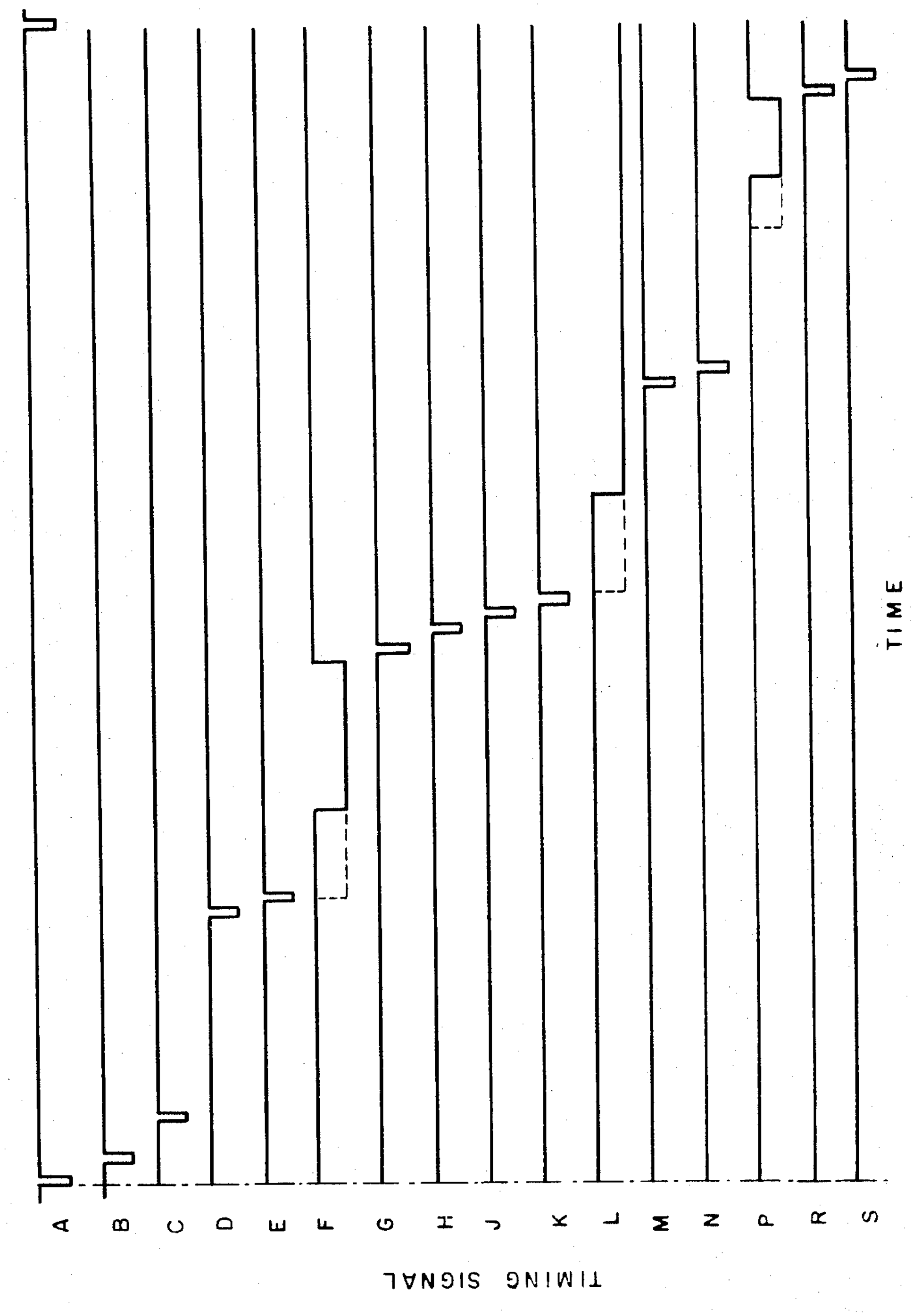
FIG. 4 is a timing diagram showing the various pulses, designated by letter, applied to the various components in FIG. 3 to control the operation of the circuit according to the invention.

For completeness of description, the signal generated from the zero detector 38 when the output of the integrating circuit 25 crosses zero has been designated F in FIG. 4, and occurs between the occurrence of pulse E at 136 microseconds and the occurrence of pulse G at 264 microseconds, at a precise time determined by the time period T plus time period $t_1$.

A pulse G from the sequencer 67 at $t$=264 microseconds is applied through OR-gate 92 to reset flip-flop 90, which causes the drive circuit 91 to open the switch 17 to disconnect the reference signal $E_r$ from the integrating circuit 25. The pulse G is also applied to the input of an OR-gate 98 which sets flip-flop 81, causing switch drive 82 to close switch 76 to provide a short circuit across the integrating capacitor 30. In this manner, the integrating circuit is cleared for the second conversion cycle.

At $t$=268 microseconds, the pulse H from the sequencer 67 causes the data to be parallel transferred from the counter 79 to register 40. The pulse H is applied to terminal 101 which is connected with inputs of a plurality of gates, designated generally at 102, having outputs connected respectively to the register 40. The number of gates 102 corresponds to the number of stages in register 40. The other input to each of the gates 102 is connected to the counter 79 so that when pulse H is applied to terminal 101, the gates 102 are enabled and the data contained in the corresponding stages in the counter 79 are thus transferred to a corresponding stage in the register 40.

The pulse H is also applied to terminal 104 to transfer the complement of the data in counter 79 to register 105. Terminal 104 is connected to one of the inputs of each of a plurality of gates 107. The other input of each of the gates is connected to a corresponding stage of the counter 79 in a manner to receive signals representing the complement of the binary count in counter 79. Thus, if the binary number 0000111 is stored in counter 79 it appears as 0000111 in register 40 and as 1111000 in register 105. The data stored in register 105 is used to generate the timing signal to control the second A to D conversion.

At $t$=270 microseconds, the timing pulse J is applied to OR-gate 80 to reset the flip-flop 81 causing switch drive circuit 82 to open switch 76 in parallel with capacitor 30. At the time pulse J is issued, the capacitor 30 is fully discharged. The timing pulse J is also used on lead 80 to set the counter 79 to zero, in anticipation of the second conversion.

A timing pulse K is issued from the sequencer 67 at $t$=272 microseconds. That pulse sets the flip-flop 106 which then causes the drive circuit 107 to close switch 22. Thus, when switch 22 is closed, the unknown input signal is applied through resistor 23 to the input of the integrating circuit 25. The pulse K also sets the flip-flop 110, which then causes the switch drive 111 by way of lead 112 to close switch 19. The switch 19 causes the reference voltage to be applied to the integrating circuit at an amplification of 32 times the input of the first conversion.

The flip-flop 110 also applies an enabling signal to a gate 118 which is connected to receive clock pulses from the clock 31 applied to terminal 117. The gate 118 when not inhibited by a signal from logic circuit 119 and when enabled by the flip-flop 110 will pass the applied clock signals to the register 105, which is connected as a binary counter to count the applied pulses. As explained above the register 105 will contain a binary number which is the binary complement of the binary number stored in register 40. Accordingly, when the register 105 has counted a number of pulses passing through the gate 118 equal to the count registered in the register 40, the register 105 will register the binary number 1111111. This condition is detected by the logic circuit 119, which then inhibits the gate 118 from passing any more clock pulses and resets the flip-flop 110. As a result the flip-flop 110 ceases to enable the gate 118 and causes the switch drive 111 to open switch 19. Thus the switch 19 is closed for a time period corresponding to the binary number stored in register 40 and in this manner the time period $t_{1a}$ occurring during curve portion 58 of FIG. 2 is determined. The signal which is produced by logic circuit 119 to inhibit gate 118 and reset flip-flop 119 is designated L in FIG. 4. This signal occurs between 272 microseconds and 399 microseconds in the timing cycle.

As indicated by the discussion with respect to the curve designated at 60 in FIG. 2, $E_x$ continues to be provided to the input of the integrating circuit 25 through resistor 23 until the timing pulse M is issued, i.e., at $t$=399 microseconds. The pulse M resets the flip-flop 106 causing the drive circuit 107 to open the switch 22. This represents the transition time between the portion of the curve designated at 60 and that designated at 62 in FIG. 2. At this time, the output voltage of the integrating circuit 25 is an error signal which has been amplified by a factor of 32 because of the sizing of the input resistors 23 and 20. This error signal represents the difference between the unknown input signal $E_x$ and the representation of this signal by the binary number stored in register 40.

At $t$=402 microseconds, the timing pulse N is issued and applied to the OR-gate 89 and thus sets the flip-flop 90 causing the drive circuit 91 to close the switch 17. When the flip-flop 90 is set it also again enables the gate 32 by way of the lead 93 to permit the passage of clock pulses on lead 72 to counter 79. The gate 32 will not be inhibited at this time by the zero detector 32 because the output voltage of the amplifier 26 will be negative. While the switch 17 is closed the integrating capacitor 30 discharges toward zero and the clock pulses passing through gate 32 are counted. This corresponds to the portion of the curve 62 shown in FIG. 2.

When the output from the integrating circuit 25 reaches zero volts, the zero detector 38 is actuated to inhibit the gate 32 stopping passage of pulses from the clock 31 on the lead 72 to the counter 79. For the range of unknown voltages contemplated, the time of this occurrence is between $t$=466 microseconds and $t$=529 microseconds. The signal produced by the zero detector at this time is designated P in the timing diagram. The digital number stored in the counter 79 after the gate 32 is inhibited represent the value of the error signal at the output of the integrator 25 at the time of pulse M, with a resolution of seven bits for the counter shown. Thus, the count in counter 79 will represent the difference between the unknown input signal and the representation of this signal by the binary number in register 40. Because the integration to determine the error signal was carried out through resistors 20 and 23 which are one thirty-second of value of the resistor 16 used to determine the binary number in register 40, the count in counter 79 will represent the error signal on a scale expanded to 32 times that on which the number in register 40 represents the input signal value.

A timing pulse R is issued by the sequencer 67 at $t$=530 microseconds. The pulse R resets the flip-flop 81 through the OR-gate 98 to control the switch drive 82 to close the switch 76 to short the integrating capacitor 30. The pulse R also resets the flip-flop 90 through OR-gate 92 to cause the drive circuit 91 to open the switch 17, which removes the reference voltage from the input of the integrating circuit.

At $t$=532 microseconds, a pulse S is applied to parallel transfer the data in counter 79 to the register 41. The two most significant bits in counter 79 are transferred in complementary form and stored in the two stages of the register 41 designated generally as 119. At the same time, the five least significant bits are transferred in true binary form. The pulse S is applied to the terminal 120 which is connected to one of the inputs of each of a plurality of gates 121. The output from each of the gates is connected to the register 41. The other inputs of each of the gates 121 is connected to an associated state in counter 79.

A timing pulse T is issued at $t$=534 microseconds, to set the flip-flop 125 to permit the clock pulses applied from the lead 69 to the terminal 126 on gate 127 to pass therethrough. The output from the gate 130 is provided by way of the leads 131 and 132 to the register 40 to enable the clock pulses to flow into register 40 and be counted thereby. The output from gate 130 is also connected by way of lead 134 to the stages 119 of register 41.

The data in register 40 contains the binary conversion data for the first pass, including the deliberate one-side error introduced by input resistor 75 when switch 74 is closed. The data in the two most significant bit stages 119 of the register 41 contains a portion of this error which is scaled down by a factor of 32 from the data contained in register 40.

The register 40 and the two most significant bit stages 119 are connected to count the clock pulses applied over leads 132 and 134. A gate 140 has inputs 141 and 142 which are respectively connected to the most significant bit stages 119 of register 41. When the data in the most significant bit stages 119 of register 41 has reached a binary count of 11, the gate 140 will inhibit gate 130 so that no more clock pulses are counted by the register 40. Since the binary complement of the two most significant binary digits or bits of the count registered in counter 79 was stored in bit stages 119, the number of pulses required to cause the bit stages 119 to count to a binary count of 11 will correspond to the number represented by these two most significant bits. Because the two most significant bit stages 119 of the register 41 overlap with the two least significant bits of the register 40 the clock pulses counted by the register 40 increase the count in the register 40 by an amount corresponding to the number represented by the two most significant bits of the count registered by the counter 79. After this counting operation the binary equivalent of the unknown input voltage will be contained in the registers 40 and 41 as a 12-bit binary number with the register 40 storing the seven most significant bits and the five least significant bit stages of the register 41 storing the five least significant bits.

At $t$=576 microseconds, equivalent to $t$=0 in the prior discussion, the cycle ends and the next cycle begins so that the data in register 40 and the five less significant bits of register 41 are parallel transferred to a storage register, which is not shown, and a new cycle begins as previously discussed.

It should be understood that the conversion time of 576 microseconds was selected to explain the concept and operation of the circuit according to the invention with a 12-bit converter which uses components presently available. The ultimate speed and accuracy of the converter is primarily dependent upon the quality of the integrator, the amplifier, the switch and two matched resistors 20, 23. Thus, a dual conversion A to D converter has been described which avoids the need for ladder networks for accurately encoding analog data into digital form.

The invention may be embodied in other specific forms without departing from its spirit or essential characteristics. The present embodiments are therefore, to be considered in all respects as illustrative and not restrictive, the scope of the invention being indicated by the claims, rather than by the foregoing description. All changes which come within the meaning and range of equivalents of the claims are therefore intended to be embraced therein.

What is claimed is:

1. An apparatus for converting analog signals into a digital representation comprising:
an input for receiving an analog input signal and for receiving a reference voltage of the opposite polarity from said analog input signal;
an integrating circuit for integrating analog signals applied thereto;
detecting means to signal when the output signal of said integrating circuit reaches a predetermined level;
a clock for generating clock signals;
counting means for counting applied clock signals; and
sequence control means, said sequence control means including;
a sequencer adapted to output a plurality of control pulses,
first switch means for connecting said analog input signal to said integrating circuit for a predetermined first interval, when commanded by a first control pulse,
second switch means for connecting said reference signal of the opposite polarity from said analog input signal to the input of said integrating circuit during a second interval following said first interval,
gate means for directing the clock signals generated by said clock to said counting means during said second interval until said detecting means signals that the output signal of said integrating circuit has reached said predetermined level to thereby register a first count in said counting means representing said analog input signal,
a first digital logic means adapted to output a first command signal,
third switch means adapted to receive said first command signal, said third switch means connecting said reference signal to said integrating circuit upon receiving said first command signal for a third time interval determined by said first count,
fourth switch means for applying said analog input signal to said integrating circuit for a fourth time interval when said fourth switch means is actuated by a second control pulse, and wherein said fourth interval includes said third interval, and second digital logic means for actuating said second switch means whereby said reference signal is applied to said integrating circuit, said second digital logic means also actuating said gate means for directing said clock signals generated by said clock to said counting means during a fifth time interval until said detecting means signals that the input signal of said integrating circuit has reached said predetermined level to thereby register in said counting means a second count representing the difference between said analog input signal and the representation of said analog input signal by said first count.

2. An apparatus as claimed in claim 1 further comprising:
bias means; and
fifth switch means for connecting said bias means to said integrating means during the predetermined first interval, said bias means providing a 1½-bit offset whereby up-counters may be used in said converter circuit.

3. The counting means of claim 1 comprising:
a counter device for counting the clock pulses during the second and fifth time intervals;
a first register for storing the first count in seven-bit form;
a second register for storing the second count in seven-bit form, said second register including two stages wherein is contained the two most significant bits of the second count in complimentary form; and
third digital logic means for supplying clock pulses to said two stages and said first register upon actuation by a third control pulse,
said third digital logic means adapted to supply clock pulses until said two stages counting said clock pulses has reached a binary count of 11 such that the binary number in said first and second registers is a 12-bit digital equivalent of said analog input signal wherein the number stored in said first register represents the seven most significant bits of said digital equivalent and the number stored in said second register represents the five least significant bits of said digital equivalent.

* * * * *